July 14, 1964  C. D. BRAUCK  3,140,884
HYDRAULIC HOSE AND COUPLING
Filed June 3, 1960  2 Sheets-Sheet 1

INVENTOR
CLIFFORD D. BRAUCK

By  ATTORNEY

United States Patent Office 3,140,884
Patented July 14, 1964

3,140,884
HYDRAULIC HOSE AND COUPLING
Clifford D. Brauck, Highland Park, Ill., assignor to Stewart-Warner Corporation, Chicago, Ill., a corporation of Virginia
Filed June 3, 1960, Ser. No. 33,665
3 Claims. (Cl. 285—242)

This application relates to hydraulic couplings and to coupling and hose assemblies which are subjected to high axial separating forces by the hydraulic fluid passing therethrough.

In the prior art, it has been necessary to assemble couplings to large size, high pressure wire braid hose at the factory or at permanent locations. So far as is known, there has been no successful field installed coupling for wire braid hose subjected to very high pressures, for example, in the order of 15,000 p.s.i. with large internal diameters, for example, in the order of one to two inches and larger. In the typical prior art method of assembly, the wires of the braid are individually brazed to the coupling structure subsequent to the removal of the hose cover. Typically, this hose is made with three or four layers of wire braid, and it is the outer layer which is brazed. A second prior art method has been the use of permanently installed giant swaging machines. It can be appreciated that the inability to make assemblies in the field gives rise to a costly stock-piling and maintenance problem. It has necessitated the special ordering, except in a few instances, of each hose and coupling assembly.

Also, there are no known field installed couplings for hose having an internal diameter in the order of 4" to 10" and larger.

One of the primary problems has been the inability of standard field-installed couplings to withstand the high axial forces to which they are subjected. For example, when the internal diameter of the hose and coupling passage is in the order of 1½" and pressures as high as 15,000 p.s.i. are encountered, the forces tending to pull the hose and coupling apart may be as large as 30,000 pounds. Standard commercial couplings cannot be relied upon under these circumstances.

It is therefore a primary object of the present invention to provide an improved coupling for field assembly with large diameter wire braid hose. In the preferred embodiment, this object is made possible by the use of a plurality of circumferentially spaced set screws projecting through the outer shell of the coupling and penetrating the hose cover to force the wire braid and core into reliable sealing and holding engagement with an inner coupling insert. The assembly is rendered even more reliable in the preferred embodiment by the forming of shallow grooves in the insert in alignment with the screws. The set screws and the groove also assure a reliable seal at the highest pressures which are encountered in the field. The rubberlike cover acts as a lock nut holding the screws in assembled position.

It is another object of the present invention to provide an improved hydraulic hose coupling characterized by circumferentially spaced fastening means retained by the coupling and adapted to penetrate and hold the hose against high axial forces.

Other objects and the many features of the present invention will be appreciated upon a perusal of the following description taken in conjunction with the accompanying drawings, in which.

Figure 1:
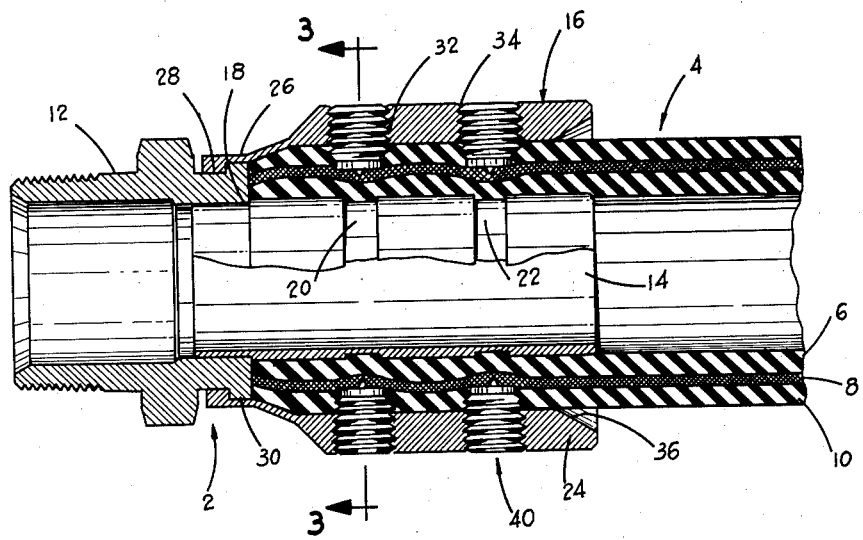
FIG. 1 is a sectional elevational view of a hose and coupling assembly embodying the teachings of the present invention.
Figure 2:
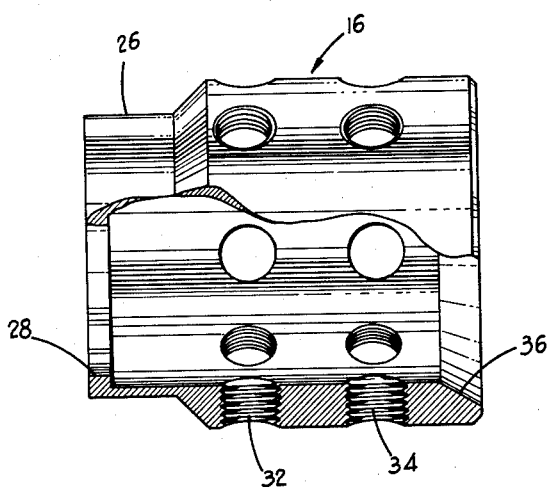
FIG. 2 is a sectional elevational view of the coupling shell of the present invention.
Figure 3:
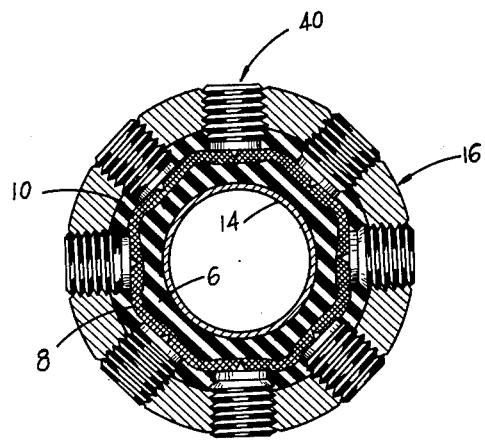
FIG. 3 is an elevational view along the line 3—3 of FIG. 1.
Figure 4:
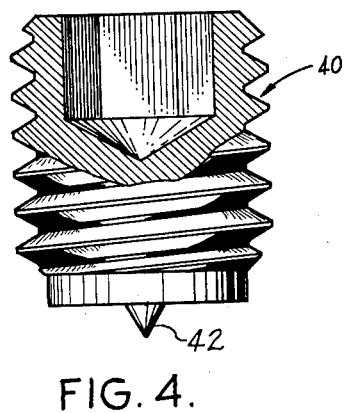
FIG. 4 is an elevational view of a preferred form of set screw used with the improved coupling.

The improved hose and coupling assembly shown in FIGS. 1–3 is one which is specifically designed for a hose having an internal diameter of 1¼". It comprises a coupling assembly 2 and a hose 4. The hose includes an inner core 6, two layers of wire braid 8, and a cover 10. The coupling includes an adapter 12, a thin wall tubular insert 14, and a tubular shell 16.

The insert 14 is press fit into the adapter 12 and brazed thereto at 18. A pair of axially spaced shallow grooves 20 and 22 are formed on the outer periphery of the insert.

The shell 16 includes a thick wall section 24 and a thin wall section 26. The section 26 is swaged in a conventional manner for connection with the adapter 12. The adapter and shell have mating annular flanges 28 and 30 which prevent their separation by axial forces.

The section 24 includes two axially spaced rows of threaded apertures 32 and 34 which are in radial alignment with the grooves 20 and 22 respectively.

The outer diameter of the insert 14 is approximately equal to the inside diameter of the hose core; and the inside diameter of the shell section 24 is slightly larger than the outside diameter of the hose cover, whereby the hose will be received within the coupling with the exertion of minimum force. The shell section 24 is expanded at 36 further to assist easy insertion of the hose.

Set screws 40 are received in each of the apertures in rows 32 and 34. The screws are forced through the hose cover to engage the wire braid. The screws are further tightened to urge the wire braid and hose core into the grooves 20 and 22. In the preferred embodiment, the set screw has generally a conical projection 42 at the inner end thereof for penetrating the wire braid to prevent slipping between the braid and screws.

As best seen in FIG. 3, the number of circumferentially spaced screws is determined primarily by the diameter of the annulus they form in their assembled positions. The inner peripheries of the screws make a reliable seal for a short circumferential distance on either side thereof. The seal provided by one screw must extend in either direction at least to the seals provided by the screws on either side thereof. Thus as the hose and coupling diameters increase for the various sizes, the number of screws in each row must be increased. Thus, eight, ten, and twelve screws per row have been found to provide excellent results for assemblies using commercially available 1¼", 1½", and 2" inside diameter hose.

The number of rows of screws will be determined primarily by the size of the hose and coupling, and by the maximum hydraulic pressures to which they will be subjected. Thus two rows of screws have been found to give excellent results for 1¼", 1½", and 2" inside diameter hose which are subjected to hydraulic pressures in the order of 15,000 p.s.i. Hose of substantially larger size, subjected to the same or substantially higher pressures, are preferably provided with three or more rows of set screws. In the event that the hose is to be subjected to maximum pressures substantially lower than 15,000 p.s.i., it will be sufficient to provide one row of set screws for acceptable operation.

While there has been described what is believed to be the preferred embodiment of the present invention, it will be appreciated that various changes and modifications may be made therein; and it is contemplated to cover in the appended claims all such changes and modifications as fall within the true spirit and scope of the invention.

What is claimed is:

1. For use with a one inch or greater I.D. high pressure hose of the type including a fluid-tight inner core and a plurality of layers of flexible wire braid over the core, a reusable readily attachable coupling, comprising a tubular insert of slightly larger dimension than the hose bore but less than the inner dimension of the wire braid and snugly insertable into the hose bore, a sleeve secured at one end to one end of the tubular insert and extending over the tubular insert spaced therefrom in generally concentric relationship therewith, said sleeve having an inner dimension slightly larger than the outer dimension of the hose adapted to receive the hose therein, said tubular insert and sleeve having, respectively, in radial alignment, an edged annular groove and a plurality of closely positioned circumferentially spaced threaded openings open to the groove, and a set screw in each of the threaded openings having a large generally flat transverse end surface adjacent the hose and a smaller centrally located pointed projection therefrom of less height than the composite wall thickness of the wire braid, said set screws being adapted to be tightened against the hose until the flat end surfaces thereof are disposed at a mean inner dimension less than the original outer dimension of the braid, whereat the set screws are in generally close proximity with each other without direct interference and directly against the wire braid, and the end surfaces define generally a polygon with each end surface being part of each side thereof, effective thereby to deform the braid radially toward the tubular insert so as to compress the inner core located therebeneath into sealing relationship with the annular groove of the tubular insert and to embed the projections into the wire braid to establish a direct metal interlock therewith, to seal and secure the hose to the coupling.

2. For use with a one inch or greater I.D. high pressure hose of the type including a fluid-tight inner core, a plurality of layers of flexible wire braid over the core, and an outer protective covering over the braid, a reusable readily attachable coupling, comprising a tubular insert of slightly larger dimension than the hose bore but less than the inner dimension of the wire braid and snugly insertable into the hose bore, a sleeve secured at one end to one end of the tubular insert and extending over the tubular insert spaced therefrom in generally concentric relationship therewith, said sleeve having an inner dimension slightly larger than the outer dimension of the covering adapted to receive the hose therein, said tubular insert and sleeve having, respectively, in radial alignment, an edged annular groove and a plurality of closely positioned circumferentially spaced threaded through-openings open to the groove, and a set screw in each of the threaded openings having a large generally flat transverse end surface adjacent the hose and a smaller centrally located pointed projection therefrom of less height than the composite wall thickness of the wire braid, said set screws being adapted to be tightened against the hose until the end surfaces thereof are disposed at a mean inner dimension less than the original outer dimension of the braid, whereat the set screws adjacent the end surfaces are in generally closest proximity to each other without, however, direct interference with each other, effective thereby first to pierce the outer covering and establish direct contact of the end surface against the braid, second to deform the braid radially toward the tubular insert so as to compress the inner core located therebeneath into sealing relationship with the annular groove of the tubular insert, and third to embed the projections into the wire braid to establish a direct metal interlock therewith, to seal and secure the hose to the coupling.

3. A coupling for high pressure hose of the type having an inner rubberlike core, an outer cover, and wire braid interposed therebetween, comprising structure including an inner thin wall tubular insert adapted to be received in the core and having a pair of axially spaced peripheral grooves, an outer tubular shell connected to the structure in concentric relation to the insert for receiving the hose therein and having a pair of axially spaced rows of circumferentially spaced radial apertures facing the grooves, and set screws received in the apertures having transverse inner surfaces piercing the hose cover and urging the wire braid and core radially inwardly into the grooves for fixed sealing engagment with the insert, each of the set screws further having from the inner surface a small pointed projection centrally of the set screw of less height than the thickness of the wire braid for embedding into the braid without puncturing the inner core, the set screws in each row being in the order of eight, ten, and twelve in number for 1¼", 1½", and 2" I.D. hose respectively.

References Cited in the file of this patent
UNITED STATES PATENTS

| | | |
|---|---|---|
| 591,468 | Gold | Oct. 12, 1897 |
| 1,971,105 | Hartman | Aug. 21, 1934 |
| 2,245,101 | Cole | June 10, 1941 |
| 2,278,239 | Butler | Mar. 31, 1942 |
| 2,314,000 | Lusher | Mar. 16, 1943 |
| 2,473,441 | Muller | June 14, 1949 |
| 2,797,111 | Beazley | June 25, 1957 |
| 3,019,038 | Cline | Jan. 30, 1962 |